US012673237B2

(12) United States Patent
D'Auria et al.

(10) Patent No.: US 12,673,237 B2
(45) Date of Patent: Jul. 7, 2026

(54) PERSONAL PERFORMANCE FEEDBACK RELATIVE TO WORKOUT COMMUNITY

(71) Applicant: Apple Inc., Cupertino, CA (US)

(72) Inventors: Anthony D'Auria, San Francisco, CA (US); Brady J. White, San Jose, CA (US); Brian R. Drell, San Jose, CA (US); Joel J. Angelone, San Francisco, CA (US); Rex Carroll Ross, San Jose, CA (US); Julie A. Arney, Los Gatos, CA (US); Jay K. Blahnik, San Francisco, CA (US); Michael D. Ford, Menlo Park, CA (US); Chandler S. Bachman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 320 days.

(21) Appl. No.: 17/407,607

(22) Filed: Aug. 20, 2021

(65) Prior Publication Data

US 2022/0062704 A1     Mar. 3, 2022

Related U.S. Application Data

(60) Provisional application No. 63/074,362, filed on Sep. 3, 2020.

(51) Int. Cl.
*A63B 24/00*     (2006.01)
*A63B 71/06*     (2006.01)
*G06F 3/16*     (2006.01)

(52) U.S. Cl.
CPC ...... *A63B 24/0062* (2013.01); *A63B 71/0622* (2013.01); *G06F 3/167* (2013.01);
(Continued)

(58) Field of Classification Search
CPC ............ A63B 24/0062; A63B 71/0622; A63B 2024/0068; A63B 2071/0625; A63B 2230/01; A63B 2230/75; G06F 3/167
See application file for complete search history.

(56) References Cited

U.S. PATENT DOCUMENTS 10,777,314 B1 *    9/2020    Williams ............... A61B 5/681
2009/0047645 A1    2/2009    Dibenedetto et al.
(Continued)

FOREIGN PATENT DOCUMENTS

JP     2009-078134 A     4/2009
JP     2014-182063 A     9/2014
(Continued)

OTHER PUBLICATIONS

Office Action received for European Application No. 21772887.2, mailed on Jan. 17, 2025, 6 pages.

*Primary Examiner* — Malina D. Blaise
(74) *Attorney, Agent, or Firm* — Invoke

(57) ABSTRACT

In some implementations, a computing system can provide personal performance feedback relative to a workout community during a workout. For example, while performing a workout, a wearable device worn by a user can provide user activity data describing the user's activity during the workout to a playback device that is presenting the workout. The playback device can obtain community statistics describing the performance of a community of users who have previously completed the workout. The playback device can present information comparing the user's performance during the workout to the community's past performance during the workout.

21 Claims, 12 Drawing Sheets

(52) U.S. Cl.
CPC ................. *A63B 2024/0068* (2013.01); *A63B 2071/0625* (2013.01); *A63B 2230/01* (2013.01); *A63B 2230/75* (2013.01)

(56) References Cited

U.S. PATENT DOCUMENTS

| | | | | |
|---|---|---|---|---|
| 2012/0253484 | A1* | 10/2012 | Burich | A63B 24/0062 700/91 |
| 2013/0115583 | A1* | 5/2013 | Gordon | G16H 40/67 434/247 |
| 2015/0065302 | A1* | 3/2015 | Ou | A61B 5/11 482/8 |
| 2015/0196805 | A1* | 7/2015 | Koduri | A63B 24/0087 482/6 |
| 2016/0279475 | A1* | 9/2016 | Aragones | G16H 50/30 |
| 2016/0379517 | A1* | 12/2016 | McGibbon | G16H 20/30 434/247 |
| 2017/0001073 | A1* | 1/2017 | Krueger | A63B 24/0062 |
| 2017/0007882 | A1* | 1/2017 | Werner | A63B 24/0021 |
| 2018/0329584 | A1* | 11/2018 | Williams | A61B 5/1112 |
| 2018/0339195 | A1* | 11/2018 | Bernotas | A63B 22/0076 |
| 2019/0143194 | A1* | 5/2019 | Evancha | A63B 24/0062 482/4 |
| 2019/0184234 | A1* | 6/2019 | Packles | A63B 24/0062 |
| 2019/0267136 | A1 | 8/2019 | Lord et al. | |
| 2019/0336827 | A1* | 11/2019 | Intonato | A63B 71/0622 |
| 2020/0001133 | A1* | 1/2020 | Rauhala | A61B 5/1118 |
| 2020/0014967 | A1* | 1/2020 | Putnam | A61B 5/6891 |
| 2020/0016457 | A1* | 1/2020 | Ben-Chanoch | A63B 24/0006 |
| 2020/0054931 | A1* | 2/2020 | Martin | G06F 3/011 |
| 2020/0160961 | A1* | 5/2020 | Wadhawan | A63B 24/0059 |
| 2021/0093919 | A1* | 4/2021 | Lyke | G16H 50/20 |
| 2021/0205660 | A1* | 7/2021 | Shavit | A63B 21/16 |
| 2021/0379447 | A1* | 12/2021 | Lee | A63B 24/0075 |
| 2023/0066552 | A1* | 3/2023 | Van Os | G06F 3/167 |

FOREIGN PATENT DOCUMENTS

| | | |
|---|---|---|
| JP | 2020-502631 A | 1/2020 |
| WO | 2019/183422 A1 | 9/2019 |
| WO | 2020/123756 A1 | 6/2020 |

* cited by examiner

900

Receive Request to Initiate User Activity Monitoring in Relation to Workout — 902

Send User Data to Playback Device, including User Weight — 904

Periodically Send Data Indicating User Activity to Playback Device — 906

Receive Workout Termination Message — 908

Send User Activity Timeline Associated with Workout to Server Device — 910

1000

Receive Request for Workout
Data from Playback Device ——— 1002

Obtain Workout Data ——— 1004

Send Workout Data to Playback
Device, Including Workout ——— 1006
Community Statistics Stream Workout Content to ——— 1008
Playback Device

1100

Receive User Activity Timeline Associated with Workout From Wearable Device — 1102

Validate User Activity Timeline — 1104

Obtain Community Statistics Timeline Corresponding to Workout — 1106

Update Community Statistics Timeline Based on User Activity Timeline — 1108

Store Updated Community Statistics Timeline as Metadata for Workout — 1110

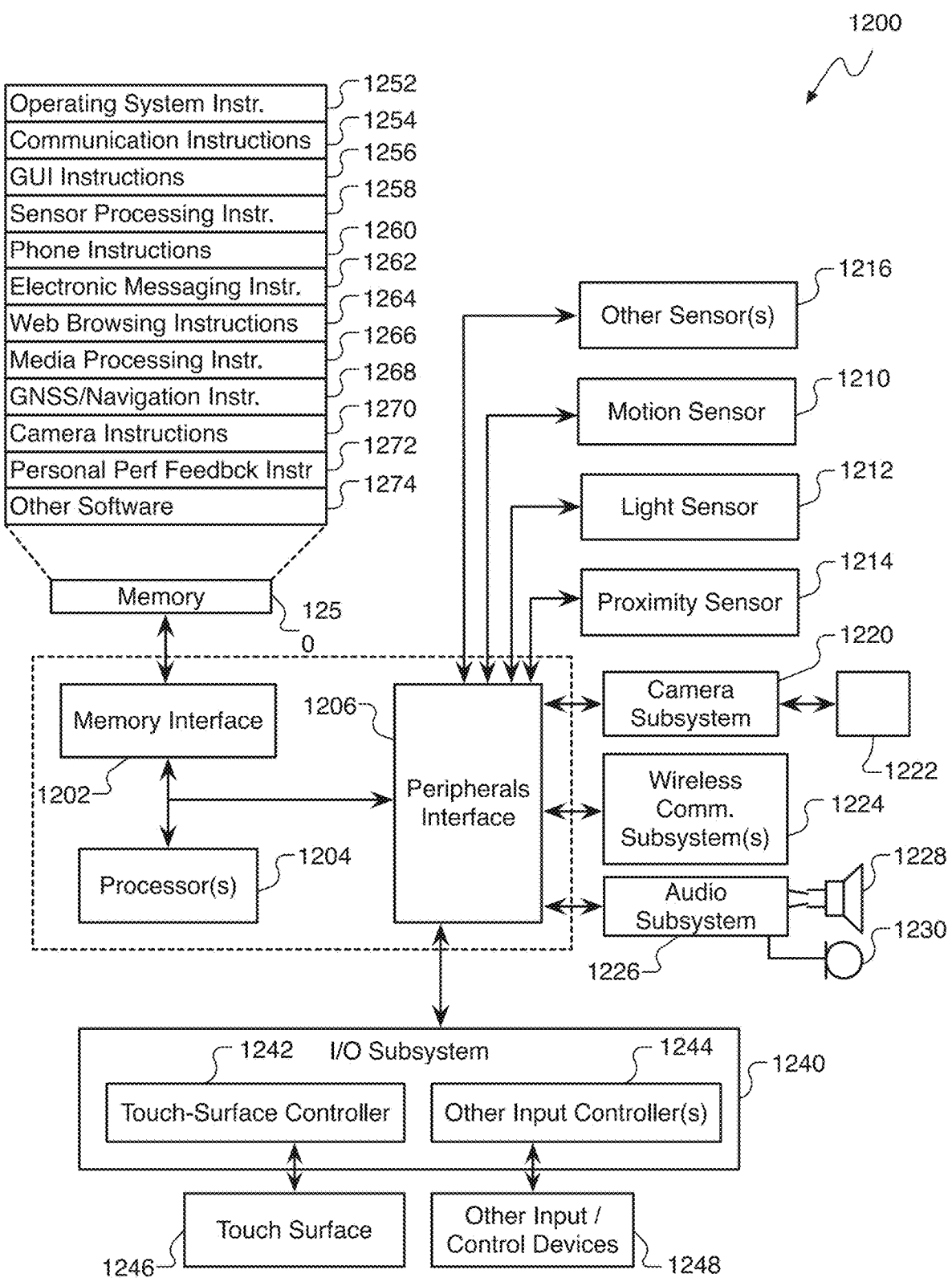

1200

| 1252 | Operating System Instr. |
| 1254 | Communication Instructions |
| 1256 | GUI Instructions |
| 1258 | Sensor Processing Instr. |
| 1260 | Phone Instructions |
| 1262 | Electronic Messaging Instr. |
| 1264 | Web Browsing Instructions |
| 1266 | Media Processing Instr. |
| 1268 | GNSS/Navigation Instr. |
| 1270 | Camera Instructions |
| 1272 | Personal Perf Feedbck Instr |
| 1274 | Other Software |

Memory

1250

Memory Interface — 1202

Processor(s) — 1204

Peripherals Interface — 1206

Other Sensor(s) — 1216

Motion Sensor — 1210

Light Sensor — 1212

Proximity Sensor — 1214

Camera Subsystem — 1220 / 1222

Wireless Comm. Subsystem(s) — 1224

Audio Subsystem — 1226 / 1228 / 1230

I/O Subsystem — 1240

Touch-Surface Controller — 1242

Other Input Controller(s) — 1244

Touch Surface — 1246

Other Input / Control Devices — 1248

FIG. 12

PERSONAL PERFORMANCE FEEDBACK RELATIVE TO WORKOUT COMMUNITY

RELATED APPLICATIONS

This application claims the benefit of the filing date of U.S. Provisional Patent Application No. 63/074,362 filed on Sep. 3, 2020, which is hereby incorporated by reference.

TECHNICAL FIELD

The disclosure generally relates to providing feedback to a user during exercise.

BACKGROUND

Many modern computing devices are configured to provide feedback during exercise to encourage a user to reach their exercise goals. Fitness trackers often provide estimates of step counts, distance traveled, time elapsed, and/or calories burned.

SUMMARY

In some implementations, a computing system can provide personal performance feedback relative to a workout community during a workout. For example, while performing a workout, a wearable device worn by a user can provide user activity data describing the user's activity during the workout to a playback device that is presenting the workout. The playback device can obtain community statistics describing the performance of a community of users who have previously completed the workout. The playback device can present information comparing the user's performance during the workout to the community's past performance during the workout.

Particular implementations provide at least the following advantages. A playback device presenting a workout that a user is performing can provide real-time, or near real-time, user feedback that compares the user's performance in the workout to other users who have performed the same workout. A wearable device worn by the user can work cooperatively with the playback device that is presenting the workout to provide real-time, or near real-time, user performance data.

Details of one or more implementations are set forth in the accompanying drawings and the description below. Other features, aspects, and potential advantages will be apparent from the description and drawings, and from the claims.

DESCRIPTION OF DRAWINGS

FIG. 12 is a block diagram of an example computing device that can implement the features and processes of FIGS. 1-11.

Like reference symbols in the various drawings indicate like elements.

DETAILED DESCRIPTION

Figure 1:
FIG. 1 is a block diagram of an example system for personal performance feedback relative to a workout community.
Figure 1:
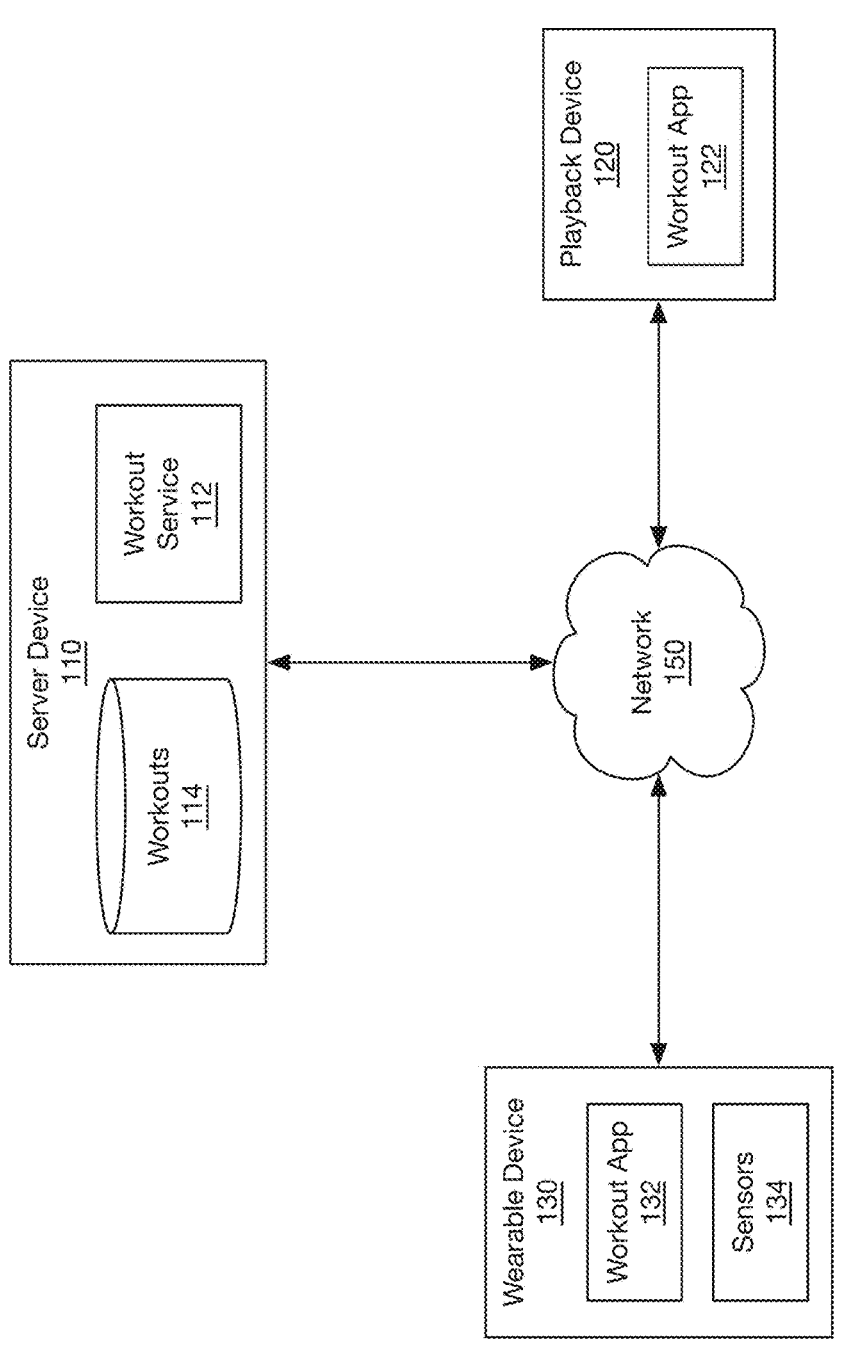

FIG. 1 is a block diagram of an example system 100 for personal performance feedback relative to a workout community. For example, a user can wear a smartwatch (e.g., wearable device) configured with sensors that measure movement, heartrate, steps taken, etc. As the user performs a workout presented by a set-top-box (e.g., playback device) through a television, the smartwatch can calculate calories burned during the workout based on the sensor data and send the calories burned and/or other biometric data to the set-top-box. The set-top-box can present feedback to the user on the television that shows the number of calories burned by the user during various points (e.g., moments) the workout relative to the number of calories burned by the community of users who have previously performed the workout. Thus, the user can be encouraged to continue or increase their efforts during the workout to improve the user's fitness.

In some implementations, system 100 can include server device 110. For example, server 110 can be a network computing device configured to host a workout service 112. For example, workout service 112 can be configured to serve various types of workouts to playback devices for presentation to a user who wishes to perform a workout. A workout can be an audio and/or video media item (e.g., a video of a fitness instructor performing and/or guiding a workout). The workout can include metadata that describes the workout. For example, the workout metadata can include a workout title, instructor name, type of workout (e.g., cardio, calisthenics, resistance training, flexibility training, etc.), and/or other descriptive data as may be described herein.

The metadata may include a community statistics timeline that includes community performance statistics (e.g., range of calories burned, percentiles of calories burned, etc.) at intervals (e.g., every 3 seconds, every 5 seconds, etc.) during the workout. The community performance statistics can be normalized so that the community performance statistics can be compared to a particular user's performance (e.g., calories burned) during the performance of a workout. For example, the community performance statistics can be normalized and/or stored as METs (e.g., metabolic equivalent of task) values. When presented to a particular user, the community performance statistics can be adapted to the particular user. For example, the community METs (e.g., 1 MET=1 Calorie/1 kg weight/1 hour exercise) values for an exercise can be multiplied the user's weight and the duration that the user exercised to estimate equivalent community calorie burn statistics for the particular user. After adapting the community METs statistics to the particular user to generate community calorie burn values, these community calorie burn values can be compared to the particular user's calorie burn values to provide feedback to the user, as described further below.

In some implementations, server device 110 can include workouts database 114. For example, workouts database 114 can store many different workouts that can be served to playback devices to guide a user through a workout. Workouts database 114 can store the audio/video content for a workout and the corresponding metadata for the workout, as described herein. For example, the community statistics timeline for each workout can be stored in association with the respective workout in workouts database 114.

In some implementations, workout database 114 can be downloaded, in whole or in part, to playback device 120. For example, when workout database 114 is downloaded and stored on playback device 120, playback device 120 can present the workout data (e.g., workout content, workout metadata, workout statistics, etc.) stored in workout database 114 to the user without having to request the workout data from workout service 112 as each workout is selected and/or performed, as described further below.

In some implementations, the community statistics stored for each interval (e.g., moment) of a particular workout can be stored and updated without storing all of the workout data (e.g., observations, performance data, calories burned, etc.) reported by the users of the workout community (e.g., the users who have participated in the particular workout). For example, server device 110 can receive workout data (e.g., a user workout timeline) from various users and/or user devices in the community of user's who have performed the particular workout. The workout data for each user in the community can indicate the user's MET values (or other normalized calorie value) at intervals during the performance of the particular workout. Server device 110 can temporarily store the received community workout data and periodically (e.g., every 24 hours, every 2 days, once a week) update the community statistics associated with the intervals of the particular workout using any well-known algorithm, such as the "P2 Algorithm for Dynamic Calculation of Quantiles and Histograms without Storing Observations" by Raj Jain and Imrich Chlamtac. After updating the community statistics using the received community workout data for the current period, server device 110 can delete the received community workout data. Thus, the workout data for individual users within a community is not stored beyond the community statistics update interval.

In some implementations, system 100 can include playback device 110. For example, playback device 110 can be a computing device, such as a set-top-box, smart speaker, tablet computer, smartphone, etc. Playback device 110 can be connected to a display device and/or speaker, for example, and is configured to present audio and/or video data associated with a workout, or other media.

In some implementations, playback device 120 can include workout application 122. For example, workout application 122 can be a client application of workout service 112. Workout application 122 on playback device 120 can communicate with workout service 112 on server device 110 through network 150 (e.g., Internet, wide area network, local area network, wireless network, cellular data network, Bluetooth network, direct peer-to-peer network, etc.) to obtain information related to workouts provided by workout service 112. For example, a user can interact with a graphical user interface (GUI) of workout application 122 to browse, search, or otherwise navigate through the various workouts available through and/or served by workout service 112 and stored in workouts database 114. A user may select a workout through the GUI of workout application 122 to cause the workout (e.g., audio and/or video presenting the workout) to be presented by playback device 120 through the display and/or speakers of playback device 120. For example, a workout may include audio and video content, video content only, or audio content only. The workout can include video of an instructor demonstrating and/or leading the user through various exercises and/or a sequence of exercises. The workout can include video of scenery simulating an environment in which the user is performing various exercises and/or a sequence of exercises. The workout can include audio of an instructor explaining the exercises and/or giving encouragement to the user performing the workout. Thus, the workout can be presented by workout application 122 on an audio/video playback device through a GUI of workout application 122, a video only playback device through a GUI of workout application 122, or an audio only playback device (e.g., a smart speaker) through a speaker of playback device 120.

In some implementations, system 100 can include wearable device 130. For example, wearable device 130 can be a smart watch, smart glasses, smart clothing, or other wearable computing device. For simplicity, wearable device 130 may be referred to herein as smartwatch 130.

In some implementations, wearable device 130 may include workout application 132. For example, workout application 132 may be a client application or companion application of workout application 122 on playback device 120. Workout application 132 on wearable device 130 and workout application 122 on playback device 120 may work cooperatively through network 150 to present a workout and corresponding feedback to the user of wearable device 130 and/or playback device 120. For example, a user may interact with workout application 132 to browse and/or select workouts. However, since wearable device 130 may have a small display and/or minimal speakers, wearable device 130 may cause the selected workout to be presented by workout application 122 on playback device 120. For example, a user may select a particular workout by interacting with wearable device 130. Workout application 132 on wearable device 130 can communicate with workout service 112 through network 150 to obtain workout descriptions and/or identifiers for various workouts from workout service 112. The user may provide input to wearable device 130 to select one of the workouts provided by workout service 112. After receiving the user's workout selection, workout application 132 on wearable device 130 can send an identifier for the workout to workout application 122 on playback device 120 so that workout application 122 can obtain the selected workout from workout service 112 using the workout identifier.

In some implementations, the user of wearable device 130 can interact with playback device 120 directly using a remote control or other input device associated with playback device 120. Workout application 122 on playback device 120 can communicate with workout service 112 to obtain workout descriptions and/or identifiers for various workouts from workout service 112. The user may provide input to playback device 120 to select one of the workouts provided by workout service 112 and presented on a GUI of workout application 122. After receiving the user's workout selection, workout application 122 can obtain the workout identifier of the selected workout so that workout application 122 can request the selected workout from workout service 112 using the workout identifier.

After receiving the workout identifier for the selected workout, workout application 122 can obtain the identified workout from workout service 112 on server device 110 along with the corresponding workout metadata. Workout application 122 can then present the workout (e.g., audio and/or video) using the display and/or speakers of playback device 120. For example, the user can select a play or start graphical object (e.g., button) to cause workout application 122 to begin presentation of the selected workout.

In some implementations, upon receiving input to begin presentation of the selected workout, workout application 122 on playback device 120 can send a message to workout application 132 on wearable device 130 to begin monitoring user activity associated with the selected workout. For example, wearable device 130 (e.g., a smartwatch) may include sensors 134. Sensors 134 may include a motion sensor, a heartbeat sensor, and/or other sensors that collect biometrics associated with the user of wearable device 130. Workout application 132, or wearable device 130, can be configured to calculate various biometric data (e.g., calories burned, heartrate, steps taken, METs values, etc.) during the workout based on the sensor data. Workout application 132 can obtain or calculate this biometric data and report the biometric data to workout application 122 on playback device 120 during the workout. For example, workout application 132 may report the biometric data according to a time interval that coincides with the community statistics timeline data intervals of the selected workout (e.g., every 3 seconds, every 5 seconds, every 6 seconds, etc.). Wearable device 130 may also report the user's weight (e.g., previously configured by the user and stored by wearable device 130) when reporting the biometric data to playback device 120 so that workout application 122 on playback device 120 can convert the community MET value statistics into calorie values according to the user's weight so that a direct comparison can be made between the user's calorie burn and the workout community's calorie burn statistics.

In some implementations, as the user's biometric data is received during the workout, workout application 122 can generate and present feedback for the user on the current workout. For example, workout application 122 can generate graphics and/or other information that describes the user's current workout effort (e.g., in calories, heartrate, etc.) compared to a community of user's who have previously performed the same workout, as described further below. When the workout is terminated (e.g., either by reaching the end of the workout or by user input to wearable device 130 or playback device 120), playback device 120 can stop the presentation of the selected workout and send a message to wearable device 130 to cease user activity monitoring related to the current workout. Upon receiving the workout termination message, wearable device 130 can stop monitoring user activity related to the workout and stop sending biometric data to playback device 120.

In some implementations, upon termination of a workout, wearable device 130 can send a user workout timeline to workout service 112 on server device 110 that includes the collected biometric data for the duration of the workout. For example, the timeline can correspond to the duration of the workout and include snapshots of the user's biometric data (e.g., calories burned, MET values, heartrate, etc.) at moments (e.g., time indices) along the timeline that correspond to a time interval prescribed by the workout or predefined in configuration for workout application 132.

Thus, the user's workout timeline sent to workout service 112 on server device 110 can include a duration that the user participated in the workout and a time indexed sequence of biometric values (e.g., calories burned, MET values, heartrate, etc.). For example, wearable device 130 may convert calories burned at the various moments in the user's workout timeline to MET values before sending the user's workout timeline to server device 110. Where wearable device 130 sends calories burned instead of MET values, the user's workout timeline may include the user's weight so that workout service 112 on server device 110 can normalize calorie burn values according to user weight and/or generate MET values for the user's biometric data. Workout service 112 may then store the user's workout timeline including the corresponding MET values until it is time to update the community statistics timeline for the workout.

In some implementations, workout service 112 can validate a user's workout timeline data before using the user's workout timeline to update the community statistics timeline corresponding to a workout. For example, workout service 112 on server device 110 can filter out (e.g., delete) received user workout timelines where the user has not completed more than a threshold amount (e.g., 80%, 70%, 90%, etc.) of the corresponding workout. For example, if the threshold is 80% complete, the workout is 60 minutes long and the user's workout timeline indicates a workout duration of 40 minutes, then the user's workout timeline (e.g., user's biometric data) for the workout will be deemed invalid, deleted, and not used to update the community statistics for the workout.

As another example, if the user's biometric data in the user's workout timeline exceeds human capacity (e.g., the user has burned more calories performing the exercise than is humanly possible), then the user's workout timeline (e.g., user's biometric data) for the workout will be deemed invalid, deleted, and not used to update the community statistics for the workout. For example, workout service 112 may compare the user's reported biometrics to a database of known (e.g., empirically determined) human limits of calories burned for various exercises to determine when the user's reported biometric data for an exercise has exceeded human limits for the exercise.

After collecting user workout timelines associated with a workout from various users over a period of time (e.g., 1 day, 2 days, 12 hours, etc.), workout service 112 can update the community statistics timeline associated with the workout based on the received user workout timelines. For example, after validating and/or deleting invalid user workout timelines, workout service 112 can update the community statistics timeline for the workout using the biometrics in the collected user workout timelines. The updated community statistics timeline for the workout can then be delivered with the workout to provide user feedback the next time the workout is performed by a user.

Figure 2:
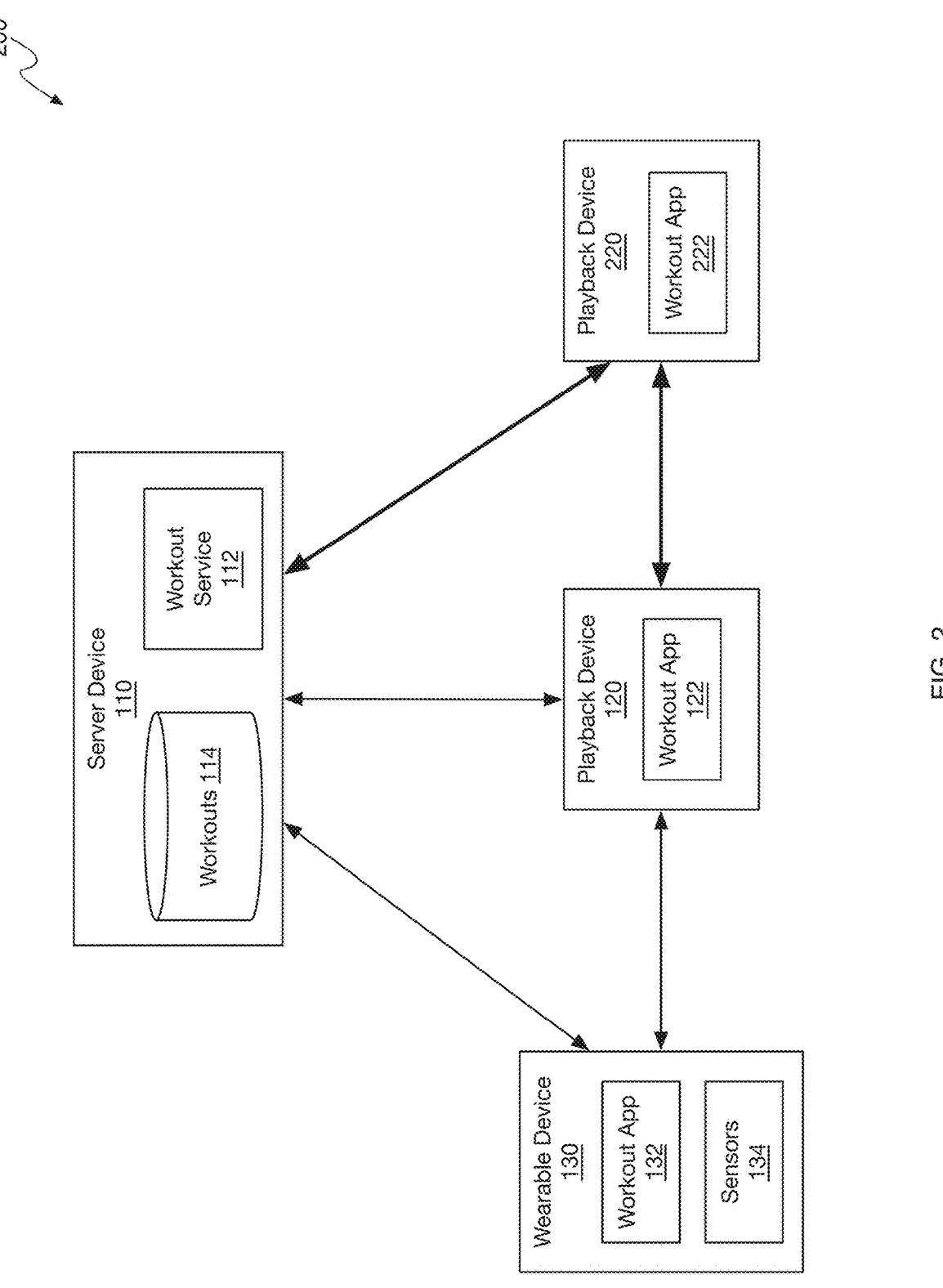
FIG. 2 is a block diagram of an example system for transferring a workout between playback devices.

FIG. 2 is a block diagram of an example system 200 for transferring a workout between playback devices. For example, system 200 can correspond to system 100 described above. However, system 200 includes an additional playback device 220. For example, a user may initiate a workout using playback device 120, as described above. Playback device 120 may be a smartphone or tablet computer, for example. The user may decide that a large television may be more convenient for performing the workout and provide input to playback device 120 or wearable device 130 to transfer the workout to playback device 220 (e.g., a set-top-box connected to a large screen television). In response to the user input, playback device 120 can send the identifier for the workout currently presented by playback device 120 and the current position (e.g., time index) in the current workout to workout application 222 on playback device 220. Workout application 222 can obtain the workout, including metadata, corresponding to the workout identifier from workout service 112 and begin presenting the workout at the current position indicated by playback device 120 (e.g., workout application 122).

However, because the workout was originally presented by playback device 120, playback device 120 has already created a connection between workout application 132 on wearable device 130 and workout application 122 on playback device 120 to obtain user biometric data associated with the workout. Thus, in some implementations, workout application 122 on playback device 120 may stay involved in the workout by forwarding the biometric data received from wearable device 130 to playback device 220 so that the biometric data flow remains uninterrupted. For example, creating a new workout connection between wearable device 130 and playback device 220 may cause a delay that may prevent a smooth transition between playback devices during a workout. Therefore, playback device 120 (e.g., the original playback device) may act as a pass through for communicating biometric data and/or other messages between playback device 220 and wearable device 130.

Figure 3:
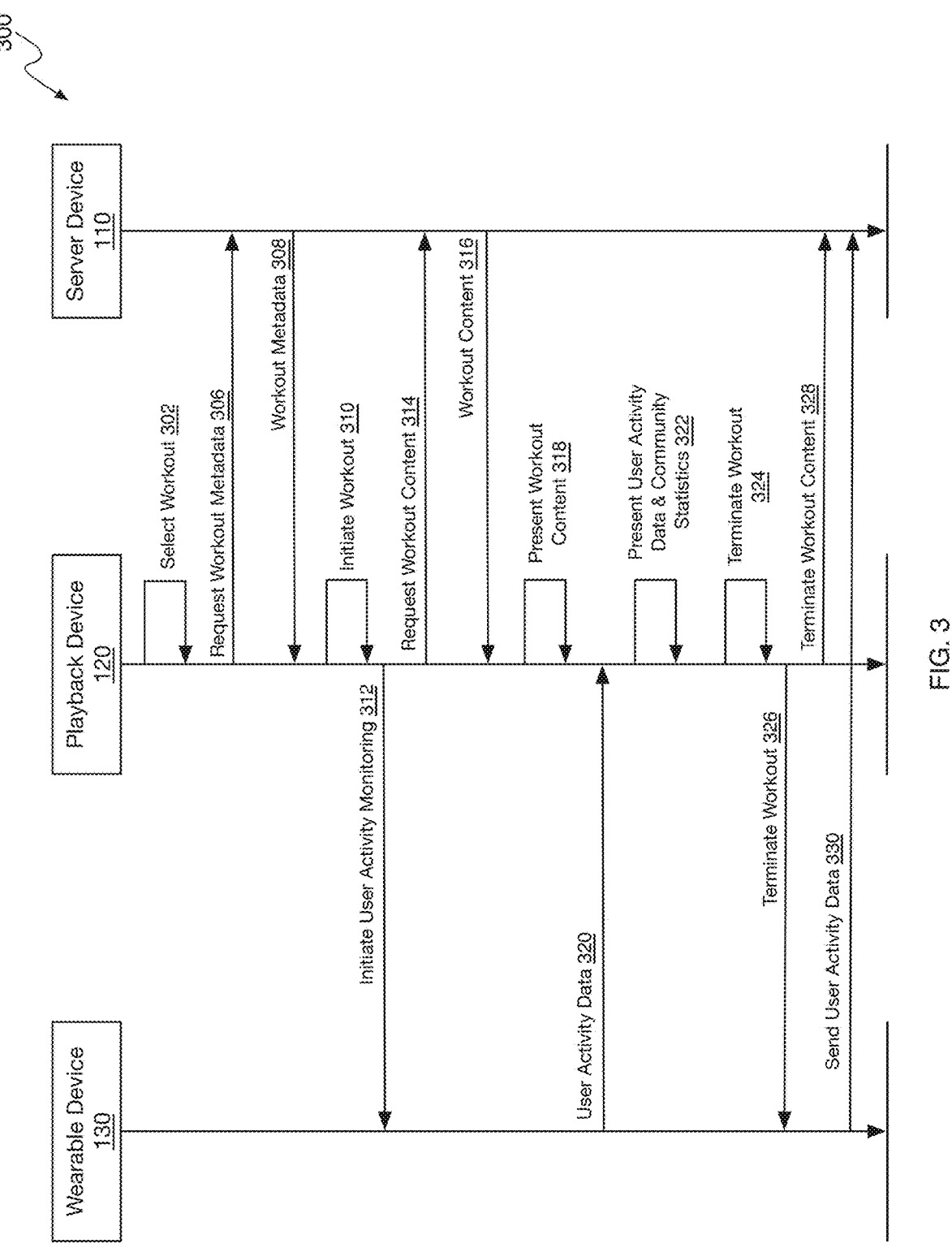
FIG. 3 is an example system interaction diagram illustrating interactions between the devices of system 100 for presenting a workout.

FIG. 3 is an example system interaction diagram 300 illustrating interactions between the devices of system 100 for presenting a workout. In some implementations, playback device 120, wearable device 130, and server device 110 can be configured to present real-time user feedback to a user participating in a workout served by server device 110 and presented by playback device 120 based on user activity data (e.g., workout data) provided by wearable device 130 during the workout.

At block 302, playback device 120 can select a workout. For example, playback device 120 can receive user input selecting a particular workout from various workouts presented by playback device 120. Playback device 120 can present a GUI that allows a user to browse, search, or otherwise navigate the various workouts available provided by server device 110. The user can provide input selecting a particular workout through a remote-control device associated with playback device 120. In some implementations, the remote-control device can be wearable device 130.

At block 306, playback device 120 can request workout metadata for the selected workout. For example, playback device 120 can send an identifier for the selected workout to server device 110 in a request for workout metadata.

At block 308, server device 110 can send the metadata for the selected workout to playback device 120. The workout metadata can include a title for the workout, the names of workout instructors appearing in the workout, the duration of the workout, the type or category of workout (e.g., cardio, calisthenics, resistance training, flexibility training, mobility training, etc.), and/or other information describing the workout. The workout meta data can include the community statistics timeline for the workout so playback device 120 can provide performance feedback to the user relative to the community of users who have previously performed the workout.

At block 310, playback device 120 can initiate the workout. For example, playback device 120 can initiate the workout automatically in response to receiving the workout metadata at step 308. Playback device 120 can initiate the workout in response to receiving user input through an input device (e.g., remote control device) connected to playback device 120.

At block 312, playback device 120 can send a message to wearable device 130 to initiate user activity monitoring. For example, playback device 120 can send a message to a smartwatch worn by the user to monitor user activity related to the selected workout. After receiving the message, wearable device 130 can send user activity data (e.g., sensor data, calories burned, MET values, steps taken, heartrate, etc.) to playback device 120 according to an interval specified for the selected workout. For example, the interval can be every 3 seconds, every 5 seconds, every 6 seconds, etc. For example, the interval can be specified in the message to initiate user activity monitoring.

At block 314, playback device 120 can request workout content from server device 110. For example, playback device 120 can request the audio and/or video data for the workout from server device 110. Playback device 120 can send the workout identifier in the content request.

At block 316, server device 110 can send the requested workout content to playback device 120. For example, server device 110 can use the workout identifier in the content request to find the corresponding workout content in workouts database 114. Server device 110 can then send the workout content to playback device 120. Server device 110 can stream the workout content over time. Server device 110 can send the workout content as a downloadable object that can be entirely downloaded to playback device 120.

At block 318, playback device 120 can present the workout content. For example, playback device 120 can present the workout content as it is streamed by playback device 120 from server device 110. Playback device 120 can present the workout content downloaded entirely to playback device 120.

At block 320, wearable device 130 can send user activity data 320 to playback device 120. For example, as playback device 120 is presenting the selected workout, wearable device can monitor user activity related to the workout and send the user activity data to playback device 120. The user activity data can include sensor data, calories burned, MET values, steps taken, heartrate, etc. The user activity data can include the user's weight. As described above, wearable device 130 can send the user activity data according to a time interval configured for the workout or configured for the workout application on wearable device 130 and/or playback device 120.

At block 322, playback device 120 can present user activity data and/or community statistics. For example, while the workout is being presented by playback device 120, playback device 120 can present real-time, or near-real time, user activity data and/or community statistic representing the performance of the workout community at points (e.g., moments) in time as the workout progresses. These points, or moments, in time can correspond to and/or coincide with the user activity reporting intervals described above.

In some implementations, playback device 120 can be configured to convert community statistics for the workout into calories adjusted according to the user's weight. For example, the community statistics (e.g., community statistics timeline) for a workout may be stored using normalized energy expenditure values (e.g., MET values). Each moment in the community statistics timeline can have corresponding MET values that define a range of MET values observed in user reported activity data (e.g., user workout timeline) from many different users and markers that represent percentile locations and MET values in the range of observations. The MET statistics at each moment in the community statistics timeline can be converted into calorie values that can be compared to the user's calorie burn by multiplying the statistical MET values at each moment by the user's weight received from wearable device 130 and the duration of the workout performed up to the current time. Thus, when wearable device 130 reports to playback device 120 the user's calories burned up to the current time (or a particular time), playback device 120 can present information comparing the user's calorie burn up to the present moment in the current workout to the workout community's historical calorie burn statistics up to the present moment in the workout. Since the community's calorie burn is adjusted for the user's weight, the community calorie burn provides an appropriate value for the user to compare the user's performance against.

At block 324, playback device 120 can terminate the workout. For example, playback device 120 can terminate the workout when playback device 120 has presented all of the content associated with the workout. Playback device 120 can terminate the workout in response to receiving user input indicating that the user wishes to terminate the workout. For example, the user input can be received through an input device (e.g., remote control, wearable device 130, etc.) associated with playback device 120.

Playback device can terminate the workout in response to detecting that the user is no longer participating in the workout. For example, playback device 120 can determine that the user is no longer participating in the workout when the connection between wearable device 130 and playback device 120 is terminated. Playback device 120 can determine that the user is no longer participating in the workout when the user activity data is not consistent with the activity expected during the current workout. For example, if the user's calorie burn does not increase at a rate that is consistent with the workout, playback device 120 may terminate the workout. If the user activity data received by playback device 120 indicates that the user is no longer moving in a manner consistent with the current workout (e.g., the user is stationary for a prolonged period of time), then playback device 120 may terminate the workout.

At block 326, playback device 120 can send a message to wearable device 130 to terminate the workout. For example, if wearable device 130 is still connected to playback device 120, playback device 120 can send a message to wearable device 130 to terminate the current workout. In response to receiving the terminate message, wearable device 130 can stop monitoring and reporting user activity to playback device 120.

In some implementations, wearable device 130 may present a notification to the user of wearable device 130 asking the user whether the user would like to terminate the workout. When the user provides input to wearable device 130 to continue the workout, wearable device 130 can send a message to playback device 120 to continue the current workout and the playback device 120 can continue presenting the workout at block 318 and presenting user activity data at block 322. When the user provides input to wearable device 130 to terminate the workout, wearable device 130, wearable device 130 can stop monitoring and reporting user activity to playback device 120.

At block 328, playback device 120 can send a message to terminate the current workout content to server device 110. For example, when the workout is terminated before the presentation of workout content has completed and server device 110 is streaming the workout content, playback device 120 can send a message to server device 110 to terminate streaming the workout content. Upon receipt of the terminate message, server device 110 terminate the workout content stream.

At block 330, wearable device 130 can send user activity data for the workout to server device 110. For example, the user activity data can include the user workout timeline that has user biometric data associated with a sequence of moments in the workout. The biometric data can include calories burned up to the corresponding moment, a MET value calculated for the corresponding moment, a heartrate at the corresponding moment, steps take up to the moment, and/or other biometric data. The timeline can include a duration of the user's activity (e.g., how long the user performed the workout). The user activity data can include a workout identifier for the workout performed by the user. Server device 110 can use the user activity data received from wearable device 130 to update the community statistics associated with the performed workout.

Figure 4:
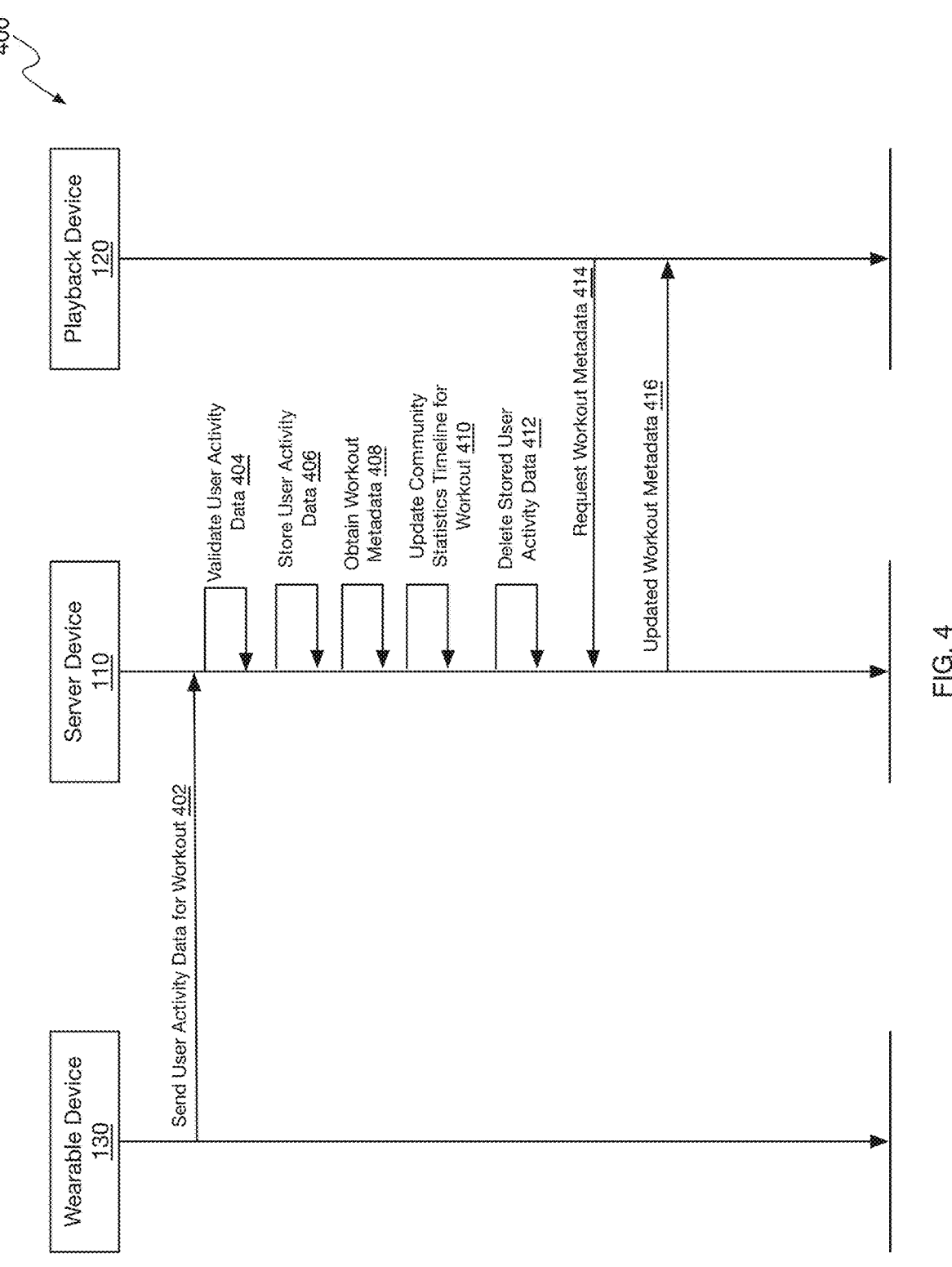
FIG. 4 is an example system interaction diagram illustrating interactions between the devices of system 100 for updating a community statistics timeline associated with a workout.

FIG. 4 is an example system interaction diagram 400 illustrating interactions between the devices of system 100 for updating a community statistics timeline associated with a workout. For example, server device 110 can update community statistics related to a particular workout based on user activity data received from various different user devices associated with many different users. Server device 110 can update the community statistics without having to store individual user activity data after the community statistics are updated thereby reducing the amount of data storage required to maintain and update community workout statistics.

At block 402, wearable device 130 can send user activity data for a workout to server device 110. For example, block 402 can correspond to block 330 of FIG. 3. The user activity data can include the identifier for the workout performed by the user, the user's weight, and the user workout timeline generated for the workout. For example, the user workout timeline can include the duration of the workout performed by the user (e.g., the actual duration of work done by the user as opposed to the duration of the workout content) and user biometric data recorded at time intervals (e.g., moments) during the workout. For example, each instance of biometric data (e.g., calories burned, MET values, steps taken, heartrate, etc.) recorded can be associated with a time index in the user's workout timeline that can be used to identify community statistics at a corresponding time index in the community statistics timeline.

At block 404, server device 110 can validate the received user activity data. For example, server device 110 can determine if the user completed more than a threshold amount (e.g., percentage, time duration, etc.) of the workout. If the user failed to complete more than the threshold amount, server device 110 can determine that the user activity data is invalid and delete the user activity data. As another example, server device 110 can determine if the user activity data includes biometric data that indicates a level of effort during the workout that exceeds human capacity. If the user activity data indicates an unrealistic level of performance, then server device can determine that the user activity data is invalid and delete the user activity data.

At block 406, server device 110 can store the user activity data. For example, server device 110 can temporarily store valid user activity data until the next community statistics update for the workout identified in the user activity data. For example, community statistics for the various workouts can be updated on a regular basis (e.g., nightly, every 36 hours, once a week, etc.).

At block 408, server device 110 can obtain workout metadata. For example, server device 110 can obtain the community statistics timeline for the workout identified in the user activity data.

At block 410, server device 110 can update the community statistics timeline for the workout. For example, for each time index (e.g., time interval, moment, entry, etc.) in the user workout timeline having user biometric data there will be a corresponding time index in the community statistics timeline for the workout. Server device 110 can update the community statistic timeline statistics for a particular time index based on the biometric data associated with the corresponding time index in the user workout timeline. Server device 110 can perform these updates for each time index in the timelines until all time indexes in the community statistics timeline are updated.

At block 412, server device 110 can delete the stored user activity data 412. For example, after updating the community statistics timeline for a particular workout based on a particular user activity data submission, server device 110 can delete the particular user activity data submission. Thus, each instance of user activity data received from the various user devices can be deleted from storage after the user activity data is processed and used to update the community statistics timeline for the corresponding workout.

At block 414, playback device 120 can request workout metadata. For example, block 414 can correspond to block 306 of FIG. 3 where playback device 120 can request workout metadata, including the community statistics timeline, in response to user input selecting a particular workout to perform.

At block 416, server device 110 can send updated workout metadata to playback device 120. For example, block 416 can correspond to block 308 where server device 110 can send workout metadata to playback device 120 that includes a community statistics timeline that was updated based on user activity data received from many different wearable devices that previously participated in the requested workout.

Figure 5:
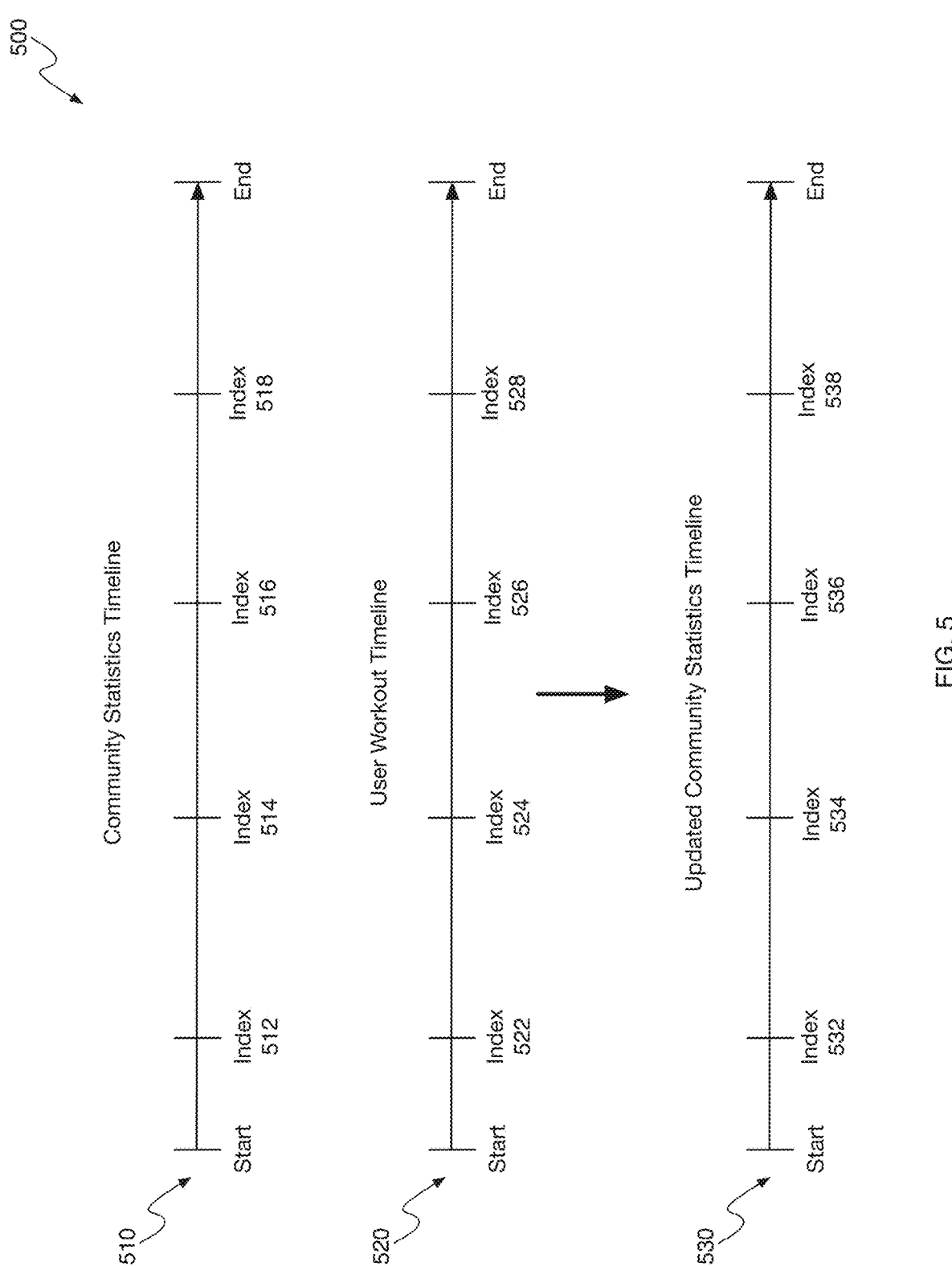
FIG. 5 is an illustration of the various workout timelines used to provide user feedback during a workout.

FIG. 5 is an illustration of the various workout timelines 500 used to provide user feedback during a workout. As described above, playback device 120 can receive a community statistics timeline as metadata for a selected workout. The community statistics timeline can include indices (e.g., moments) at a regular interval (e.g., every 3 seconds, every 4 seconds, every 5 seconds, etc.) over the duration of a workout. Thus, if the duration of workout (e.g., the duration of the workout content) is 30 minutes and the interval is 3 seconds, community statistics timeline 510 can include 600 indices spaced 3 seconds apart over the duration of 30 minutes. A user workout timeline associated with a workout will have the same number of indices at the same intervals as the community statistics timeline of the same workout. In the description that follows, timeline 510, timeline 520, and timeline 530 all correspond to the same workout but timeline 510 and timeline 530 may include data from different performances of the same workout by different users within a workout community (e.g., users who have performed a particular workout).

In some implementations, community statistics timeline 510 can include community statistics for the selected workout corresponding to each time index (e.g., index 512, 514, 516, 518, etc.) on community statistics timeline 510. For example, the community statistics at a particular time index (e.g., index 514) can describe the MET values (e.g., or calories burned, or steps taken, or heartrate, etc.) reported by a community of users who performed the same workout as calculated from the start of the workout up to the particular time index on timeline 510. The community statistics for each index can include maximum and minimum MET values defining a range of MET values and percentile markers (e.g., 10%, 36%, 68%, 90%, etc.) that playback device 120 can use to determine where a user's workout performance is located in the range of community MET values for a particular time index (e.g., index 514).

In some implementations, user workout timeline 520 can include individual user MET values (e.g., or calories burned, or steps taken, or heartrate, etc.) reported by an individual user's wearable device 130 during the performance of a workout as calculated from the start of the workout up to the particular time index (e.g., index 522, 524, 526, 528, etc.) on user workout timeline 520. During the performance of a workout, wearable device 130 can report the user's MET value, or calories burned, when each time index is reached, or as each time interval passes, as the workout progresses. Playback device 120 can receive the user's MET value, or calories burned, and compare the user's reported MET value, or calories burned, to the community statistics at the corresponding time index in the community statistics timeline. For example, when playback device 120 receives the MET value, or calories burned, at time index 524, playback device 120 can compare the MET value to the community statistics MET values stored at corresponding time index 514 in community statistics timeline 510 to determine in which percentile, or between which percentiles, the user's performance fits. Playback device 120 can then generate a graphical user interface to present the user's performance data in relation to the community statistics associated with time index 514/524.

In some implementations, wearable device 130 can store user workout timeline 520 and the MET values corresponding to each index until the end of the workout. At the end of the workout, wearable device 130 can send user workout timeline 520 (e.g., user activity data) to server device 110 so that server device 110 can update the community statistics associated with community statistics timeline 510 based on the MET values generated for user statistics timeline 520 during the user's performance of the workout.

In some implementations, server device 110 can generate updated community statistics timeline 530 based on community statistics timeline 510 and user workout timeline 520. For example, server device 110 can use the MET values at each index of user workout timeline 520 to update the community statistics associated with corresponding indices of community statistics timeline 510 to generate indices (e.g., index 532, 534, 536, 538, etc.) of updated community statistics timeline 530. For example, if time index 518 of community statistics timeline 510 corresponds to time index 528 of user workout timeline 520 and time index 538 of updated community statistics timeline 530, then server device 110 can use the MET value stored at time index 528 of user workout timeline and the community statistics stored at time index 518 of community statistics timeline 510 to calculate updated community statistics (e.g., MET range, percentiles, etc.) that are stored in association with index 538 of updated community statistics timeline 530. The updated community statistics timeline 530 can then be distributed to playback devices when the corresponding workout is subsequently selected by a user, as described above.

Figure 6:
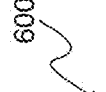
FIG. 6 illustrates an example graphical user interface for presenting a user's workout performance relative to a community of users who have performed the current workout.
Figure 6:
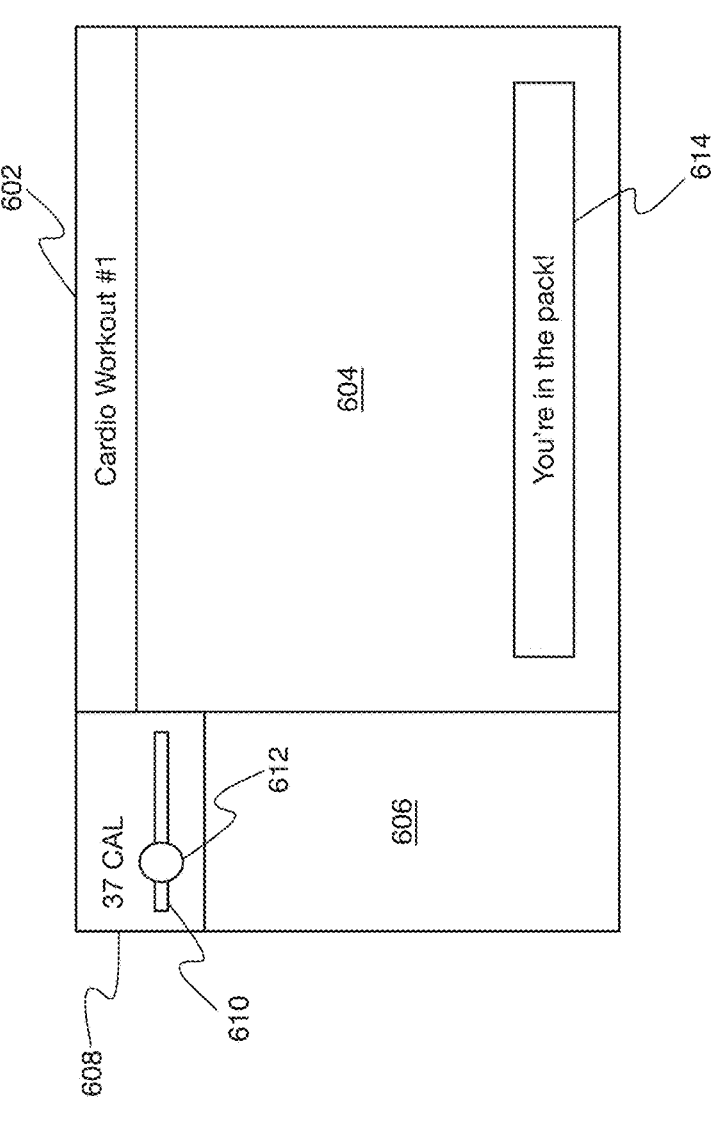

FIG. 6 illustrates an example graphical user interface 600 for presenting a user's workout performance relative to a community of users who have performed the current workout. For example, GUI 600 can be presented by workout application 122 on a display of playback device 120 (or playback device 220). GUI 600 can present workout content and/or feedback that describes the user's performance in the workout and/or the user's performance relative to a community of users who have previously performed the selected workout.

In some implementations, GUI 600 can include a title 602 for the selected workout and a display area 604 for presenting video content corresponding to the selected workout. GUI 600 can include an area 606 for presenting descriptive metadata (e.g., type of workout, instructor name, duration, etc.) of the selected workout.

In some implementations, GUI 600 can include graphical object 608 for presenting user performance feedback. As described above, when performing a workout, wearable device 130 can report the user's weight and number of calories burned, or the MET value, up to the current point in the workout to playback device 120. If wearable device 130 reports the MET value, playback device 120 can use the user's weight to convert the MET value into calories burned up to the current time or location in the workout. A numerical value representing the user's calories burned (e.g., "37 Cal") during the workout up to the current time can be presented in graphical object 608.

In some implementations, graphical object 608 can present graphical objects 610 and 612 representing the user's performance relative to a community of users who have previously performed the current workout. For example, graphical object 610 can represent a range of calories burned or MET values representing the range of the community's performance in the workout. Graphical object 612 can represent the user's performance in the current workout. Graphical object 612 can be placed on graphical object 610 at a location within the community's performance range that represents the user's performance (e.g., in calories burned, MET value, etc.) relative to the community. Graphical objects 610 and 612 can represent the user's performance at the current time. For example, at 5 minutes into performing the workout graphical object 610 can represent the community statistics from the community statistics timeline at a time index on the community statistics timeline that is closest to 5 minutes from the beginning of the workout. Graphical object 612 can represent the user's performance up to the 5-minute mark in the workout. Thus, the user can receive feedback on the user's performance at the 5-minute mark and compare the user's performance to other users' performances at the 5-minute mark in the workout.

In some implementations, graphical objects 610 and 612 can be dynamically adjusted as the workout progresses. For example, as the workout progresses in time, graphical object 610 can be adjusted based on the community statistics associated with each subsequent time index in the community statistics timeline so that graphical object 610 reflects the community statistics at the time or location in the workout currently being presented. Similarly, graphical object 612 and its position relative to graphical object 610 can by dynamically adjusted as the workout progresses. For example, as the workout progresses the user may increase or decrease their effort and therefore their calories burned, or MET value, may increase or decrease. The change in effort of the user or the change in community statistics at a specific time index may cause graphical object 612 to change position relative to graphical object 610. Thus, graphical object 612 representing the user's effort (e.g., in calories burned, MET value, etc.) may move higher or lower (e.g., right or left relative to graphical object 610) in the range of community values (e.g., calories, MET values, etc.) represented by graphical object 610.

In some implementations, graphical objects 610 and 612 can be presented using calories burned as the unit of measurement. When calories are used or presented, playback device 120 can convert the MET values in the community statistics timeline to calorie values appropriate for comparing to the user's performance by multiplying the MET values by the weight (e.g., in kilograms) of the user and the duration (e.g., in hours) of the workout up to the current time (e.g., Calories=MET value*weight*time). In some implementations, graphical objects 610 and 612 can be presented using MET values. For example, wearable device 130 can calculate MET values at regular intervals during the workout and report the MET values to playback device 130. Playback device 130 can then just use MET value as the unit of measurement when presenting graphical objects 610 and 612.

In some implementations, GUI 600 can present performance status notifications 614 to the user as the workout progresses. For example, playback device 120 can present notifications (e.g., audio, video, text, etc.) that verbally inform the user of their current performance relative to the community of users who previously performed the current workout. These notifications can be presented to provide motivation to the user to increase their performance or effort or maintain a high level of performance. These notifications are described further below in reference to FIG. 7.

Figure 7:
FIG. 7 is an illustration depicting example percentile ranges and user performance feedback relative to a community of users who performed the same workout.
Figure 7:
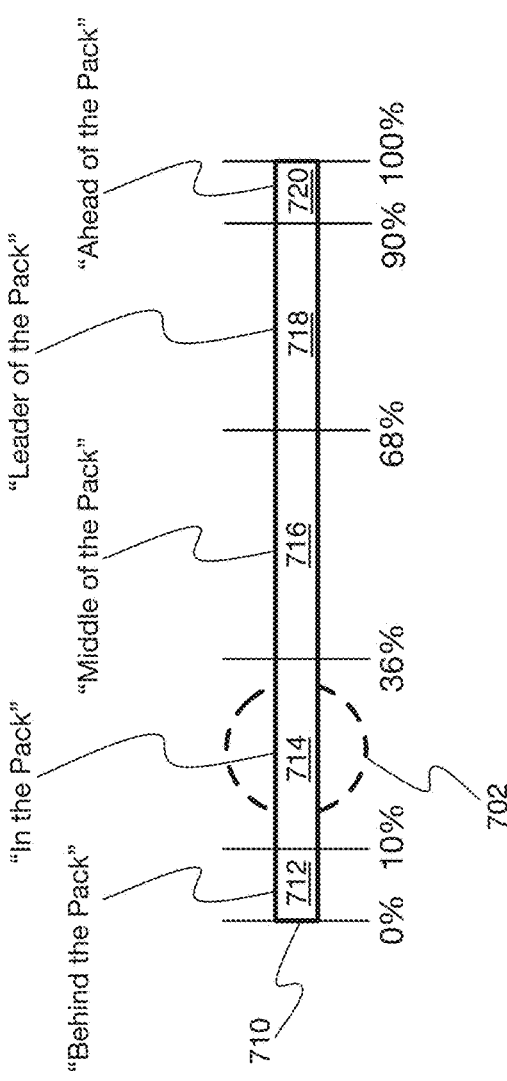

FIG. 7 is an illustration 700 depicting example percentile ranges and user performance feedback relative to a community of users who performed the same workout. For example, graphical object 702 can correspond to graphical object 612 of FIG. 6. Graphical object 710 can correspond to graphical object 610 of FIG. 6.

In some implementations, graphical object 710 can represent community statistics for a particular (e.g., current) time index in a workout. Since the community statistics timeline corresponds to the workout timeline or duration, a time index in the community statistics timeline has a corresponding time index (e.g., location, position, etc.) in the workout. As described above, the community statistics at any time index can include a range of MET values (e.g., minimum value, maximum value) and percentile markers that indicate the MET values that correspond to percentile boundaries within the range of MET values. In the example of FIG. 7, the percentile markers are located at 0%, 10%, 36%, 68%, 90%, and 100%. Each percentile marker can have a corresponding MET value within the range of MET values that corresponds to the percentile boundary. By comparing the MET values (or Calorie values) corresponding to the percentile markers to the user's current MET value, playback device 120 can determine where the user's performance falls within the range of community MET values. Playback device 120 can then place graphical object 702 representing the user's current performance at a location on graphical object 710 representing the community range of MET values corresponding to the user's current performance. For example, if the user's current MET value, or Calories burned, falls between the 10-percentile marker and the 36-percentile marker, then playback device 120 can place graphical object 702 at a location on graphical object 710 between the 10-percentile marker and the 36-percentile marker.

In some implementations, the percentile ranges of MET values, or Calories burned, can be used by playback device 120 to present status notifications. For example, the range of MET values, or Calories burned, correspond to a range of values 712 between 0% and 10%, range 714 between 10% and 36%, range 716 between 36% and 68%, range 718 between 68% and 90%, and range 720 between 90% and 100%. While specific percentile boundaries are described, these percentiles boundaries are merely examples and may be adjusted, more percentile boundaries added, or some percentile boundaries removed.

In some implementations, each range of MET values, or Calories burned, may have a corresponding description that represents or describes the range of values in relation to other MET values, or Calories burned, in the community statistics at the particular time index in the workout. For example, since range 712 corresponds to the lowest MET values, the corresponding description can indicate that a MET value in this range is at the bottom of the range of values. For example, using a race metaphor, the description can indicate that MET values, or Calorie values, in this range represent an effort or performance during the workout that is "Behind the Pack". On the other hand, since range 720 corresponds to the highest MET values, the corresponding description can indicate that a MET value in this range is at the top of the range of values. For example, using a race metaphor again, the description can indicate that MET values, or Calorie values, in this range represent an effort or performance during the workout that is "Ahead the Pack". Similarly, range 714 near the low-middle of the overall range can be described as "In the Pack". Range 716 in the middle of the overall range can be described as "Middle of the Pack". Range 718 in the high-middle of the overall range can be described as "Leader of the Pack".

In some implementations, the performance range descriptions described above can be used to generate performance status notifications that describe the user's workout performance and/or encourage the user. For example, playback device 120 can use the performance range descriptions to generate status notification 614 of FIG. 6. For example, playback device 120 can receive the user's current MET value or Calories burned from wearable device 130. Playback device 120 can obtain the community statistics for the current time index of the current workout and determine to which performance range (e.g., range 712, 714, 716, 718, 720, etc.) the user's MET value or Calories burned corresponds. Playback device 120 can then generate and present a status notification based on the performance range description associated with the corresponding performance range. For example, if the user's MET value corresponds to performance range 718, playback device 120 can present status notification 614 indicating that the user is "Leader of the Pack."

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 8:
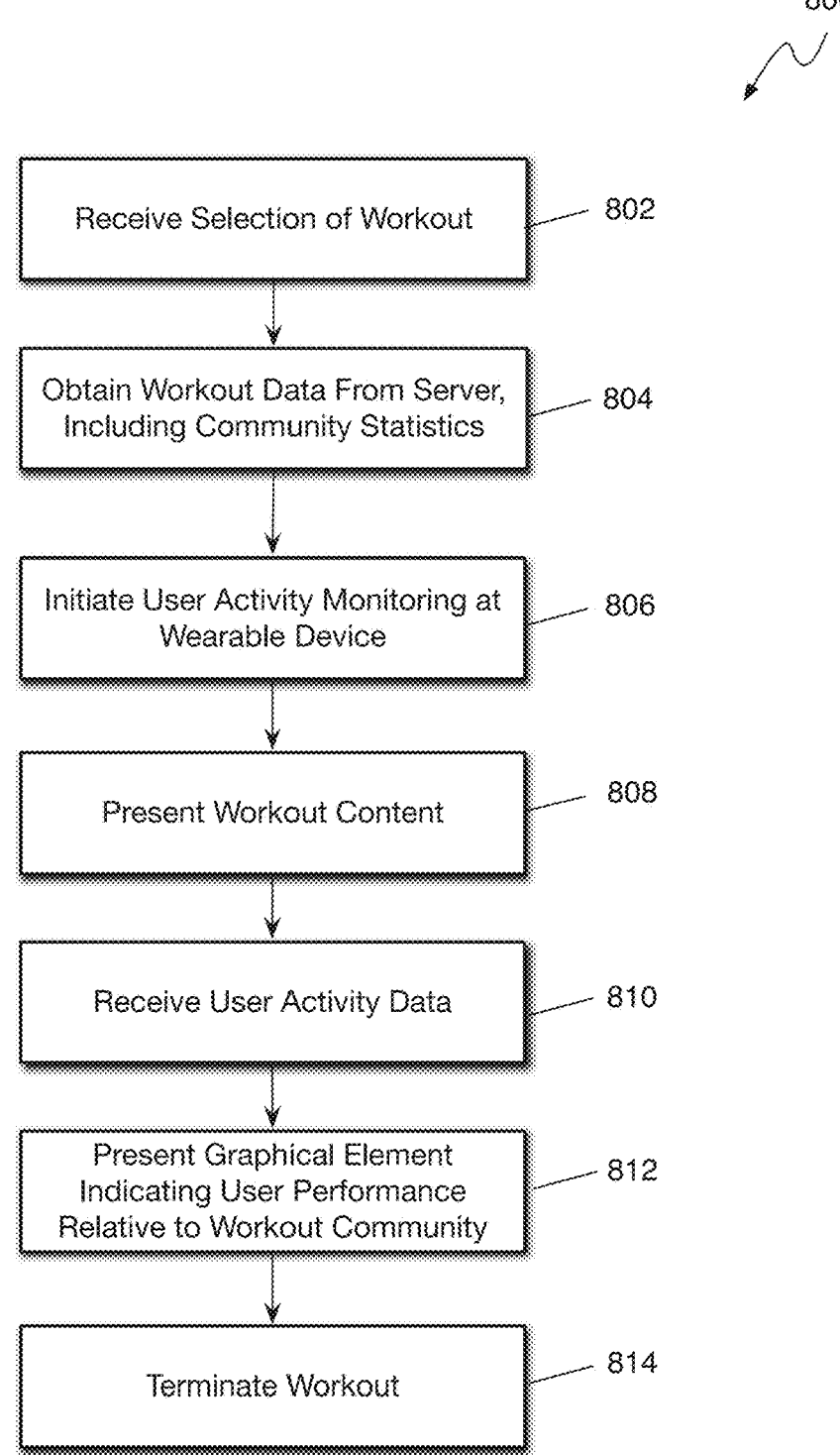
FIG. 8 is flow diagram of an example process for presenting personal performance feedback relative to a community.

FIG. 8 is flow diagram of an example process 800 for presenting personal performance feedback relative to a community. For example, process 800 can be performed by playback device 120 to present feedback describing a user's personal performance during a workout relative to a community of users who previously performed the same workout.

At step 802, playback device 120 can receive a selection of a workout. For example, playback device 120 can receive user input through an input device (e.g., remote control, wearable device 130, etc.) selecting a particular workout that the user wishes to perform from among many different workouts.

At step 804, playback device 120 can obtain workout data from server device 110. For example, playback device 120 can send an identifier for the selected workout to workout service 112 on server device 110. Workout service 112 can obtain the workout data (e.g., workout content, workout metadata, etc.) for the workout corresponding to the workout identifier from workouts database 114 and send the workout data to playback device 120.

At step 806, playback device 120 can initiate user activity monitoring at wearable device 130. For example, playback device 120 can send a message to wearable device 130 indicating that presentation of a workout is about to begin. In response to receiving the message, wearable device 130 can begin monitoring user activity related to the workout and periodically send user activity data according to a defined time interval, as described above.

At step 808, playback device 120 can present workout content. For example, playback device 120 can present audio and/or video data for the workout. The audio and/or video data can provide instructions for the workout and/or lead the user through the workout.

At step 810, playback device 120 can receive user activity data. For example, playback device 120 can periodically receive user activity data that includes biometric data and/or other information that describes the user's activity as the workout progresses. The user activity data can indicate Calories burned, MET values, steps taken, heartrate, and/or other user activity data. The user activity data can indicate the user's weight, which may be used by playback device 120 to convert MET values (e.g., community MET values, user MET values, etc.) into a number of Calories appropriate for the user's weight.

At step 812, playback device 120 can present graphical elements indicating the user's performance relative to the community of users who previously performed the same workout. For example, playback device 120 can present graphical objects 608, 610, 612 and/or 614 described above with reference to FIG. 6. Playback device 120 can present graphical objects 702 and/or 710 described above with reference to FIG. 7. While the description herein focuses on presenting information related to a user's energy expenditure (e.g., Calories burned, MET values, etc.) during a workout, a similar approach can be used to present other user activity data (e.g., heartrate, steps taken, etc.) related to a workout in relation to corresponding community workout statistics.

At step 814, playback device 120 can terminate the workout. For example, playback device 120 can terminate the workout when the presentation of the workout content has completed. Playback device 120 can terminate the workout when the user provides input to terminate the workout. Playback device 120 can terminate the workout when playback device 120 detects that the user is no longer participating in the workout, as described above.

Figure 9:
FIG. 9 is a flow diagram of an example process for providing user activity data associated with a workout.
Figure 9:
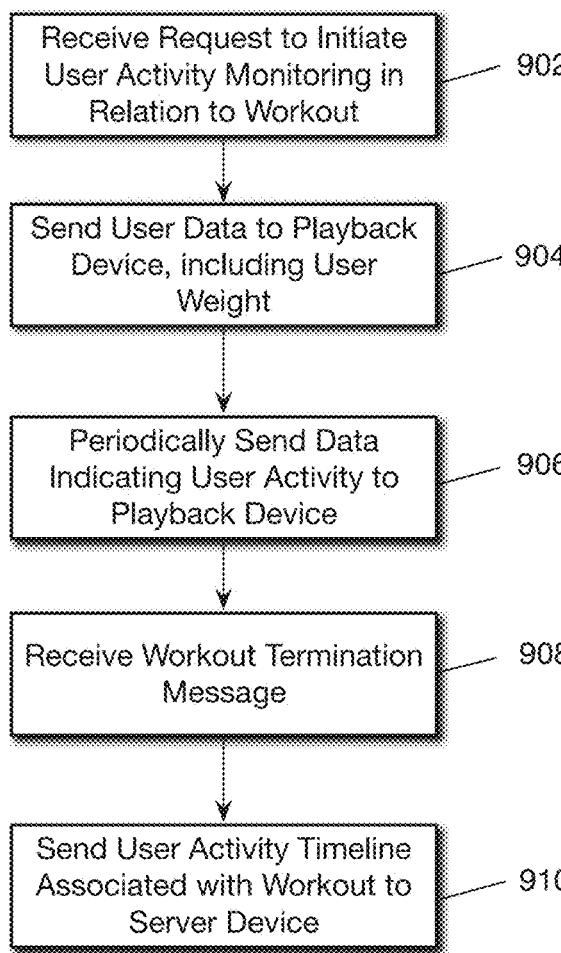

FIG. 9 is a flow diagram of an example process 900 for providing user activity data associated with a workout. For example, process 900 can be performed by wearable device 130 to provide user activity data to playback device 120 during a workout so that playback device 120 can present personal performance feedback relative to a community of users who previously performed the same workout.

At step 902, wearable device 130 can receive a request to initiate user activity monitoring in relation to a workout. For example, wearable device 120 can receive a message from playback device 120 indicating that a workout is about to being and that wearable device 130 should begin monitoring and reporting user activity related to the workout.

At step 904, wearable device 130 can send user data to playback device 120. For example, wearable device 130 can send the user's weight to playback device 120 so that playback device 120 can convert MET values (e.g., community MET values, user MET values, etc.) into Calories burned when presenting feedback to the user.

At step 906, wearable device 130 can periodically send data indicating user activity to playback device 120. For example, the user activity data can include a MET value representing the user's activity during the workout, Calories burned, steps taken, heartrate, etc.

At step 908, wearable device 130 can receive a workout termination message. For example, wearable device 130 can receive a workout termination message from playback device 120 indicating that the current workout has been terminated. In response to receiving the termination message, wearable device 130 can stop monitoring and reporting user activity related to the workout.

At step 910, wearable device 130 can send a user activity timeline associated with the terminated workout to server device 110. For example, wearable device 130 can send to server device 110 a user activity timeline that includes user activity data associated with periodic time indexes that progress over the duration of the user's participation in the workout, as described above.

Figure 10:
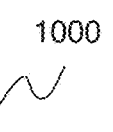
FIG. 10 is a flow diagram of an example process for serving workout content from a server device.
Figure 10:
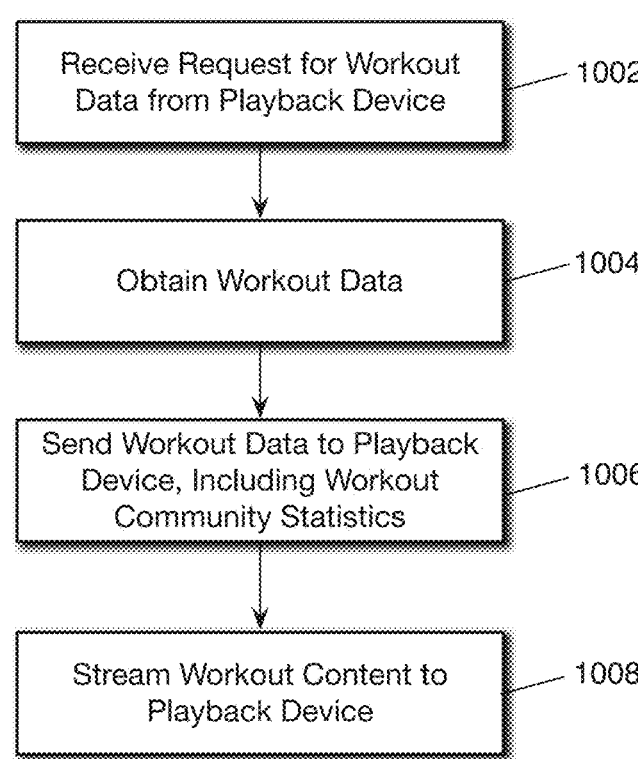

FIG. 10 is a flow diagram of an example process 1000 for serving workout content from a server device. For example, process 1000 can be performed by server device 110 to serve workout content to playback device 120.

At step 1002, server device 110 can receive a request for workout data from playback device 120. For example, workout service 112 can receive a workout request that includes an identifier for a workout selected by a user of wearable device 130.

At step 1004, server device 110 can obtain workout data. For example, workout service 112 can obtain workout data for a workout corresponding to the workout identifier from workouts database 114. The workout data can include workout content (e.g., audio and/or video data) and workout metadata (e.g., information describing the workout, community statistics timeline, etc.).

At step 1006, server device 110 can send the workout data to playback device 120. For example, if server device 110 is configured to download the workout content to playback device 120, then server device 110 can send the workout content and the workout metadata to playback device 120. However, if server device 110 is configured to stream the workout content, server device 110 can send the workout metadata, including community statistics timeline, to playback device 120 and stream the workout content to playback device 120 at step 1008.

At step 1008, server device 110 can stream the workout content corresponding to the workout identifier to playback device 120. For example, workout service 112 can receive a message from playback device 120 indicating that workout services 112 should start streaming the workout content. Playback device 120 can send the message in response to receiving user input indicating that the user wishes to begin the workout. In response to receiving the message from playback device 120, workout service 112 can stream the workout content to playback device 120 for presentation to the user.

Figure 11:
FIG. 11 is a flow diagram of an example process for updating community statistics corresponding to a workout.
Figure 11:
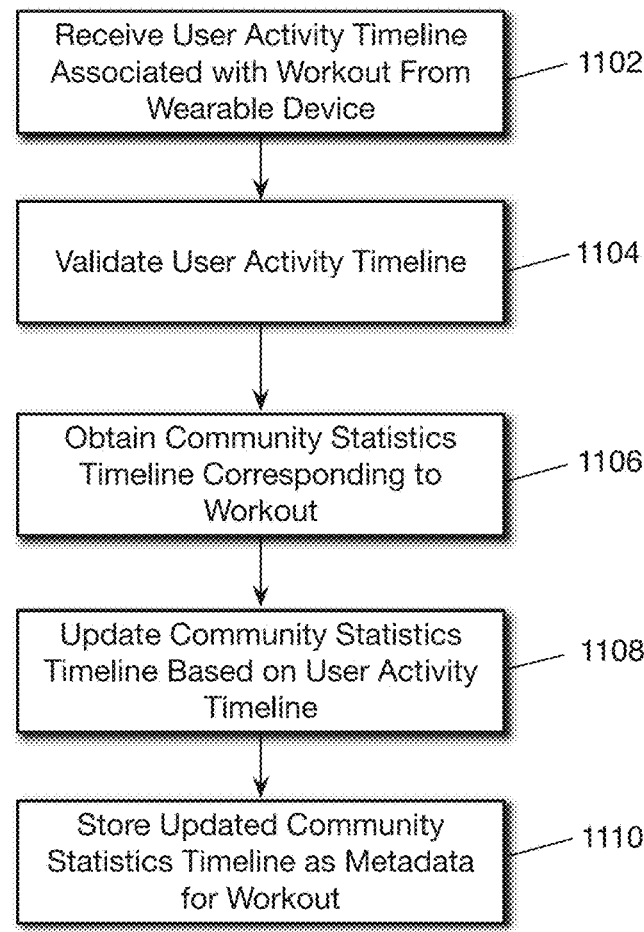

FIG. 11 is a flow diagram of an example process 1100 for updating community statistics corresponding to a workout. For example, process 1100 can be performed by server device 110 to updating the community statistics (e.g., community statistics timeline) corresponding to a workout based on individual user activity data (e.g., user workout timeline) associated with the workout.

At step 1102, server device 110 can receive a user activity timeline associated with a workout from wearable device 130. For example, wearable device 130 can send the user activity timeline to server device 110 upon termination of a workout. The user activity timeline can include an identifier for the workout performed by the user corresponding to the user activity timeline.

At step 1104, server device 110 can validate the user activity timeline. For example, workout service 112 on server device 110 can filter out (e.g., delete) received user workout timelines where the user has not completed more than a threshold amount (e.g., 80%, 70%, 90%, etc.) of the corresponding workout. For example, if the threshold is 80% complete, the workout is 60 minutes long and the user's workout timeline indicates a workout duration of 40 minutes, then the user's workout timeline (e.g., user's biometric data) for the workout will be deemed invalid, deleted, and not used to update the community statistics for the workout.

As another example, if the user's biometric data in the user's workout timeline exceeds human capacity (e.g., the user has burned more calories performing the exercise than is humanly possible), then the user's workout timeline (e.g., user's biometric data) for the workout will be deemed invalid, deleted, and not used to update the community statistics for the workout. For example, workout service 112 may compare the user's reported biometrics to a database of known (e.g., empirically determined) human limits of calories burned for various exercises to determine when the user's reported biometric data for an exercise has exceeded human limits for the exercise.

At step 1106, server device 110 can obtain a community statistics timeline corresponding to the workout. For example, workout service 112 can use the workout identifier received with the user activity timeline to obtain workout metadata from workouts database 114 for the workout corresponding to the workout identifier.

At step 1108, server device 110 can update the community statistics timeline based on the user activity timeline. For example, workout service 112 can update the community statistics at each time index of the community statistics timeline based on the user activity data associated with a corresponding time index of the user activity timeline, as described above with reference, for example, to FIG. 5.

At step 1110, server device 110 can store the updated community statistics timeline as metadata for the workout. For example, workout service 112 can replace the community statistics timeline associated with the identified workout with the updated community statistics timeline in workouts database 114.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers, smart phones, smart watches, wearable devices, and/or other computing devices. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to improve user feedback when performing a workout. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to encourage the user to increase their performance during a workout to improve their health. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, personal performance feedback during a workout, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, encouragement during a workout can be provided based on non-personal information data or a bare minimum amount of personal information, such as the content being requested by the device associated with a user, other non-personal information available to the workout service, or publicly available information.

Example System Architecture

FIG. 12 is a block diagram of an example computing device 1200 that can implement the features and processes of FIGS. 1-11. The computing device 1200 can include a memory interface 1202, one or more data processors, image processors and/or central processing units 1204, and a peripherals interface 1206. The memory interface 1202, the one or more processors 1204 and/or the peripherals interface

1206 can be separate components or can be integrated in one or more integrated circuits. The various components in the computing device 1200 can be coupled by one or more communication buses or signal lines.

Sensors, devices, and subsystems can be coupled to the peripherals interface 1206 to facilitate multiple functionalities. For example, a motion sensor 1210, a light sensor 1212, and a proximity sensor 1214 can be coupled to the peripherals interface 1206 to facilitate orientation, lighting, and proximity functions. Other sensors 1216 can also be connected to the peripherals interface 1206, such as a global navigation satellite system (GNSS) (e.g., GPS receiver), a temperature sensor, a biometric sensor, magnetometer or other sensing device, to facilitate related functionalities.

A camera subsystem 1220 and an optical sensor 1222, e.g., a charged coupled device (CCD) or a complementary metal-oxide semiconductor (CMOS) optical sensor, can be utilized to facilitate camera functions, such as recording photographs and video clips. The camera subsystem 1220 and the optical sensor 1222 can be used to collect images of a user to be used during authentication of a user, e.g., by performing facial recognition analysis.

Communication functions can be facilitated through one or more wireless communication subsystems 1224, which can include radio frequency receivers and transmitters and/ or optical (e.g., infrared) receivers and transmitters. The specific design and implementation of the communication subsystem 1224 can depend on the communication network(s) over which the computing device 1200 is intended to operate. For example, the computing device 1200 can include communication subsystems 1224 designed to operate over a GSM network, a GPRS network, an EDGE network, a Wi-Fi or WiMax network, and a Bluetooth™ network. In particular, the wireless communication subsystems 1224 can include hosting protocols such that the device 100 can be configured as a base station for other wireless devices.

An audio subsystem 1226 can be coupled to a speaker 1228 and a microphone 1230 to facilitate voice-enabled functions, such as speaker recognition, voice replication, digital recording, and telephony functions. The audio subsystem 1226 can be configured to facilitate processing voice commands, voiceprinting and voice authentication, for example.

The I/O subsystem 1240 can include a touch-surface controller 1242 and/or other input controller(s) 1244. The touch-surface controller 1242 can be coupled to a touch surface 1246. The touch surface 1246 and touch-surface controller 1242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1246.

The other input controller(s) 1244 can be coupled to other input/control devices 1248, such as one or more buttons, rocker switches, thumb-wheel, infrared port, USB port, and/or a pointer device such as a stylus. The one or more buttons (not shown) can include an up/down button for volume control of the speaker 1228 and/or the microphone 1230.

In one implementation, a pressing of the button for a first duration can disengage a lock of the touch surface 1246; and a pressing of the button for a second duration that is longer than the first duration can turn power to the computing device 1200 on or off. Pressing the button for a third duration can activate a voice control, or voice command, module that enables the user to speak commands into the microphone 1230 to cause the device to execute the spoken command. The user can customize a functionality of one or more of the buttons. The touch surface 1246 can, for example, also be used to implement virtual or soft buttons and/or a keyboard.

In some implementations, the computing device 1200 can present recorded audio and/or video files, such as MP3, AAC, and MPEG files. In some implementations, the computing device 1200 can include the functionality of an MP3 player, such as an iPod™.

The memory interface 1202 can be coupled to memory 1250. The memory 1250 can include high-speed random-access memory and/or non-volatile memory, such as one or more magnetic disk storage devices, one or more optical storage devices, and/or flash memory (e.g., NAND, NOR). The memory 1250 can store an operating system 1252, such as Darwin, RTXC, LINUX, UNIX, OS X, WINDOWS, or an embedded operating system such as VxWorks.

The operating system 1252 can include instructions for handling basic system services and for performing hardware dependent tasks. In some implementations, the operating system 1252 can be a kernel (e.g., UNIX kernel). In some implementations, the operating system 1252 can include instructions for performing personal performance feedback during a workout. For example, operating system 1252 can implement the personal performance feedback features as described with reference to FIGS. 1-11.

The memory 1250 can also store communication instructions 1254 to facilitate communicating with one or more additional devices, one or more computers and/or one or more servers. The memory 1250 can include graphical user interface instructions 1256 to facilitate graphic user interface processing; sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1264 to facilitate web browsing-related processes and functions; media processing instructions 1266 to facilitate media processing-related processes and functions; GNSS/Navigation instructions 1268 to facilitate GNSS and navigation-related processes and instructions; and/or camera instructions 1270 to facilitate camera-related processes and functions.

The memory 1250 can store software instructions 1272 to facilitate other processes and functions, such as the personal performance feedback processes and functions as described with reference to FIGS. 1-11.

The memory 1250 can also store other software instructions 1274, such as web video instructions to facilitate web video-related processes and functions; and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1250 can include additional instructions or fewer instructions. Furthermore, various functions of the computing device 1200 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method comprising:

obtaining, by a playback device, a workout from a server device, the workout including workout content and community statistics for the workout, wherein the playback device comprises a processor, a memory, and a wireless communication component;

displaying, by the playback device, the workout content;

in real time, while presenting the workout content to a user:

receiving, using the wireless communication component by the playback device from a wearable device via a wireless connection, user activity data related to the workout, the wearable device being worn by the user currently performing the workout;

generating, by the playback device, workout feedback comparing the user activity data to the community statistics for the workout, the community statistics comprising previously generated data describing past user activity data of a community of users who previously performed the workout;

wherein the community statistics include a community statistics timeline, the community statistics timeline corresponding to a duration of the workout content and including a plurality of time indices having corresponding time indexed community statistics for the workout, wherein generating the workout feedback comprises:

determining, by the playback device, a first time index corresponding to a current location in a presentation of the workout to the user;

mapping the first time index, corresponding to the current location in the presentation of the workout to the user, to a second time index of the plurality of time indices; and generating, by the playback device, the workout feedback based on a particular time indexed community statistic associated with the second time index in the community statistics timeline; and displaying, by the playback device, the workout feedback.

2. The method of claim 1, wherein the user activity data includes individual user data describing a first number of calories burned by the user during performance of the workout, the community statistics include community data describing statistics related to a second number of calories burned by a community of users who previously performed the workout, and further comprising:

generating the workout feedback comparing the first number of calories burned to the community statistics related to a second number of calories burned.

3. The method of claim 2, further comprising:

receiving, using the wireless communication component by the playback device, information describing a weight of the user from the wearable device; and adjusting the community statistics related to a second number of calories burned based on the weight of the user.

4. The method of claim 1, wherein the user activity data is received periodically during the presentation of the workout content, wherein the first time index corresponds to a first time at which the user activity data was received.

5. The method of claim 4, further comprising:

obtaining, by the playback device, a range of values from the community statistics corresponding to the first time index, the range of values representing a range of energy expenditures of the community of users who previously performed the workout;

obtaining, by the playback device, a current energy expenditure value for the user performing the workout based on the user activity data corresponding to the first time;

determining, by the playback device, a position in the range of values based on the current energy expenditure value for the user;

generating, by the playback device, a performance status notification describing the position relative to the range of values; and displaying, by the playback device, the performance status notification.

6. The method of claim 5, wherein the performance status notification is a verbal audio notification.

7. The method of claim 1, wherein the wearable device comprises one of a smart watch, a pair of smart glasses, or an item of smart clothing.

8. The method of claim 1, wherein the wearable device comprises at least one sensor.

9. The method of claim 8, wherein the at least one sensor comprises one of a motion sensor or a heartbeat sensor.

10. The method of claim 8, wherein the wearable device is configured to:

generate biometric data based on data received from the at least one sensor; and send the biometric data to the playback device while the workout content is being displayed.

11. A non-transitory computer readable medium including one or more sequences of instructions that, when executed by one or more processors, cause the processors to perform operations comprising:

obtaining, by a playback device, a workout from a server device, the workout including workout content and community statistics for the workout, wherein the playback device comprises a processor, a memory, and a wireless communication component;

displaying, by the playback device, the workout content;

in real time, while presenting the workout content to a user:

receiving, using the wireless communication component by the playback device from a wearable device via a wireless connection, user activity data related to the workout, the wearable device being worn by the user currently performing the workout;

generating, by the playback device, workout feedback comparing the user activity data to the community statistics for the workout, the community statistics comprising previously generated data describing past user activity data of a community of users who previously performed the workout;

wherein the community statistics include a community statistics timeline, the community statistics timeline corresponding to a duration of the workout content and including a plurality of time indices having corresponding time indexed community statistics for the workout, wherein generating the workout feedback comprises:

determining, by the playback device, a first time index corresponding to a current location in a presentation of the workout to the user;

mapping the first time index, corresponding to the current location in the presentation of the workout to the user, to a second time index of the plurality of time indices; and generating, by the playback device, the workout feedback based on a particular time indexed community statistic associated with the second time index in the community statistics timeline; and displaying, by the playback device, the workout feedback.

12. The non-transitory computer readable medium of claim 11, wherein the user activity data includes individual user data describing a first number of calories burned by the user during performance of the workout, the community statistics include community data describing statistics related to a second number of calories burned by a community of users who previously performed the workout, and wherein the instructions cause the processors to perform operations comprising:

generating the workout feedback comparing the first number of calories burned to the community statistics related to a second number of calories burned.

13. The non-transitory computer readable medium of claim 12, wherein the instructions cause the processors to perform operations comprising:

receiving, using the wireless communication component by the playback device, information describing a weight of the user from the wearable device; and adjusting the community statistics related to a second number of calories burned based on the weight of the user.

14. The non-transitory computer readable medium of claim 11, wherein the user activity data is received periodically during the presentation of the workout content, and wherein the first time index corresponds to a first time at which the user activity data was received.

15. The non-transitory computer readable medium of claim 14, wherein the instructions cause the processors to perform operations comprising:

obtaining, by the playback device, a range of values from the community statistics corresponding to the first time index, the range of values representing a range of energy expenditures of the community of users who previously performed the workout;

obtaining, by the playback device, a current energy expenditure value for the user performing the workout based on the user activity data corresponding to the first time;

determining, by the playback device, a position in the range of values based on the current energy expenditure value for the user;

generating, by the playback device, a performance status notification describing the position relative to the range of values; and displaying, by the playback device, the performance status notification.

16. The non-transitory computer readable medium of claim 15, wherein the performance status notification is a verbal audio notification.

17. A system comprising:

one or more processors; and a non-transitory computer readable medium including one or more sequences of instructions that, when executed by the one or more processors, cause the processors to perform operations comprising:

obtaining, by a playback device, a workout from a server device, the workout including workout content and community statistics for the workout, wherein the playback device comprises a processor, a memory, and a wireless communication component;

displaying, by the playback device, the workout content;

in real time, while presenting the workout content to a user:

receiving, using the wireless communication component by the playback device from a wearable device via a wireless connection, user activity data related to the workout, the wearable device being worn by the user currently performing the workout;

generating, by the playback device, workout feedback comparing the user activity data to the community statistics for the workout, the community statistics comprising previously generated data describing past user activity data of a community of users who previously performed the workout;

wherein the community statistics include a community statistics timeline, the community statistics timeline corresponding to a duration of the workout content and including a plurality of time indices having corresponding time indexed community statistics for the workout, wherein generating the workout feedback comprises:

determining, by the playback device, a first time index corresponding to a current location in a presentation of the workout to the user;

mapping the first time index, corresponding to the current location in the presentation of the workout to the user, to a second time index of the plurality of time indices; and generating, by the playback device, the workout feedback based on a particular time indexed community statistic associated with the second time index in the community statistics timeline; and displaying, by the playback device, the workout feedback.

18. The system of claim 17, wherein the user activity data includes individual user data describing a first number of calories burned by the user during performance of the workout, the community statistics include community data describing statistics related to a second number of calories burned by a community of users who previously performed the workout, and wherein the instructions cause the processors to perform operations comprising:

generating the workout feedback comparing the first number of calories burned to the community statistics related to a second number of calories burned.

19. The system of claim 18, wherein the instructions cause the processors to perform operations comprising:

receiving, using the wireless communication component by the playback device, information describing a weight of the user from the wearable device; and adjusting the community statistics related to a second number of calories burned based on the weight of the user.

20. The system of claim 17, wherein the user activity data is received periodically during the presentation of the workout content, and wherein the first time index corresponds to a first time at which the user activity data was received.

21. The system of claim 20, wherein the instructions cause the processors to perform operations comprising:

obtaining, by the playback device, a range of values from the community statistics corresponding to the first time index, the range of values representing a range of energy expenditures of the community of users who previously performed the workout;

obtaining, by the playback device, a current energy expenditure value for the user performing the workout based on the user activity data corresponding to the first time;

determining, by the playback device, a position in the range of values based on the current energy expenditure value for the user;

generating, by the playback device, a performance status notification describing the position relative to the range of values; and displaying, by the playback device, the performance status notification.

* * * * *